US009456187B1

United States Patent
Liu et al.

(10) Patent No.: US 9,456,187 B1
(45) Date of Patent: Sep. 27, 2016

(54) EDGE-BASED POSE DETECTION

(75) Inventors: Qiang Liu, Cupertino, CA (US);
Samuel Henry Chang, San Jose, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 137 days.

(21) Appl. No.: 13/486,634

(22) Filed: Jun. 1, 2012

(51) Int. Cl.
*H04N 5/228* (2006.01)
*H04N 9/04* (2006.01)
*G06F 3/01* (2006.01)
*H04W 4/02* (2009.01)

(52) U.S. Cl.
CPC ............. *H04N 9/045* (2013.01); *G06F 3/017* (2013.01); *H04W 4/02* (2013.01)

(58) Field of Classification Search
CPC ............. G06T 7/0046; G06T 7/0079; G06T 2207/30244; G06F 17/28; G06F 17/3087; G06F 3/0481; G06F 3/04883; H04W 4/02
USPC ........................................................ 345/663
See application file for complete search history.

(56) References Cited

U.S. PATENT DOCUMENTS

| | | | |
|---|---|---|---|
| 6,151,403 A | 11/2000 | Luo | |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,190,278 B2 * | 5/2012 | Kneissler | ........................ 700/83 |
| 2004/0036813 A1 | 2/2004 | Matsuda | |
| 2006/0043264 A1 | 3/2006 | Sakurai | |
| 2006/0098877 A1 | 5/2006 | Barnes et al. | |
| 2007/0122039 A1 | 5/2007 | Zhang et al. | |
| 2008/0144942 A1* | 6/2008 | Besley | ................. G06K 9/6204 382/209 |
| 2009/0022365 A1* | 1/2009 | Kotake | ......................... 382/103 |
| 2010/0022220 A1 | 1/2010 | Gupta et al. | |
| 2010/0199232 A1* | 8/2010 | Mistry et al. | ................. 715/863 |
| 2011/0154233 A1 | 6/2011 | Lamarca et al. | |
| 2011/0234879 A1* | 9/2011 | Kashitani | ................. 348/333.02 |
| 2012/0223885 A1 | 9/2012 | Perez | |
| 2012/0249416 A1 | 10/2012 | Maciocci et al. | |
| 2013/0044193 A1 | 2/2013 | Kulkarni | |

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

Edelsbrunner, et al., "On the Shape of a Set of Points in the Plane", IEEE Transactions on Information Theory, vol. 29, No. 4, Jul. 1983, pp. 551-559.

(Continued)

*Primary Examiner* — Twyler Haskins
*Assistant Examiner* — Padma Haliyur
(74) *Attorney, Agent, or Firm* — Lee & Hayes, PLLC

(57) ABSTRACT

Techniques are described for determining the pose of a surface based on a point set representing the surface. Corner models are matched to a contour of the point set using a difference minimization technique to identify corner poses of the surface. Based on the corner poses, a virtual model of the surface is created and matched to the point set to determine the pose of the surface.

23 Claims, 5 Drawing Sheets

(56) References Cited

OTHER PUBLICATIONS

Klasing, et al., "Comparison of Surface Normal Estimation Methods for Range Sensing Applications", Proceeding ICRA'09 Proceedings of the 2009 IEEE international conference on Robotics and Automation, 2009, 6 pgs.

Olsen, et al. "Multi-Scale Gradient Magnitude Watershed Segmentation", 9th International Conference, ICIAP 97, Florence, Italy, 1997, 8 pages.

Cao, et al., "Interacting with Dynamically Defined Information Spaces Using a Handheld Projector and a Pen", UIST'06, Oct. 15-18, 2006, Montreux, Switzerland, ACM, 2006, pp. 225-234.

Office Action for U.S. Appl. No. 13/486,664, mailed on Jan. 30, 2014, Samuel Henry Chang, "Pose Tracking", 17 pages.

Summet, et al., "Tracking Locations of Moving Hand-Held Displays Using Projected Light", Pervasive 2005, LNCS 3468, Springer-Verlag Berlin Heidelberg, May 2005, pp. 37-46.

Zhang, et al., "Visual Panel: Virtual Mouse, Keyboard and 3D Controller with an Ordinary Piece of Paper", PUI 2001, Orlando, FL, USA, ACM, Nov. 2001, pp. 1-8.

Office Action for U.S. Appl. No. 13/537,424, mailed on Jan. 8, 2015, "Shape-Based Edge Detection", Ning Yao, 31 pages.

Jacobs, "Correlation and Convolution", Class Notes for CMSC 426 (Fall 2005), Retrieved from <<http://www.cs.umd.edu/~djacobs/CMSC426/Convolution.pdf>>, Fall 2005, 17 pages.

Office action for U.S. Appl. No. 13/537,424, mailed on Jul. 30, 2015, Yao et al., "Shape-Based Edge Detections", 32 pages.

\* cited by examiner

EDGE-BASED POSE DETECTION

BACKGROUND

A large and growing population of people is enjoying entertainment through consumption of digital content items, such as music, movies, images, books and so on. Many people today consume digital content through a wide variety of electronic devices. Among these electronic devices are cellular telephones, personal digital assistants (PDAs), electronic book readers, portable media players, tablets, netbooks and the like.

As more content is made available in digital form, people continue to consume more and more of this content. In addition, this population expects digital content to become more and more accessible and ubiquitous.

Although content has become easier to obtain, a number of issues remain. For example, people may have difficulty determining and locating the appropriate device to use for a particular action. In addition, once the device is identified, the device still needs to be operable and properly configured to perform the desired task.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
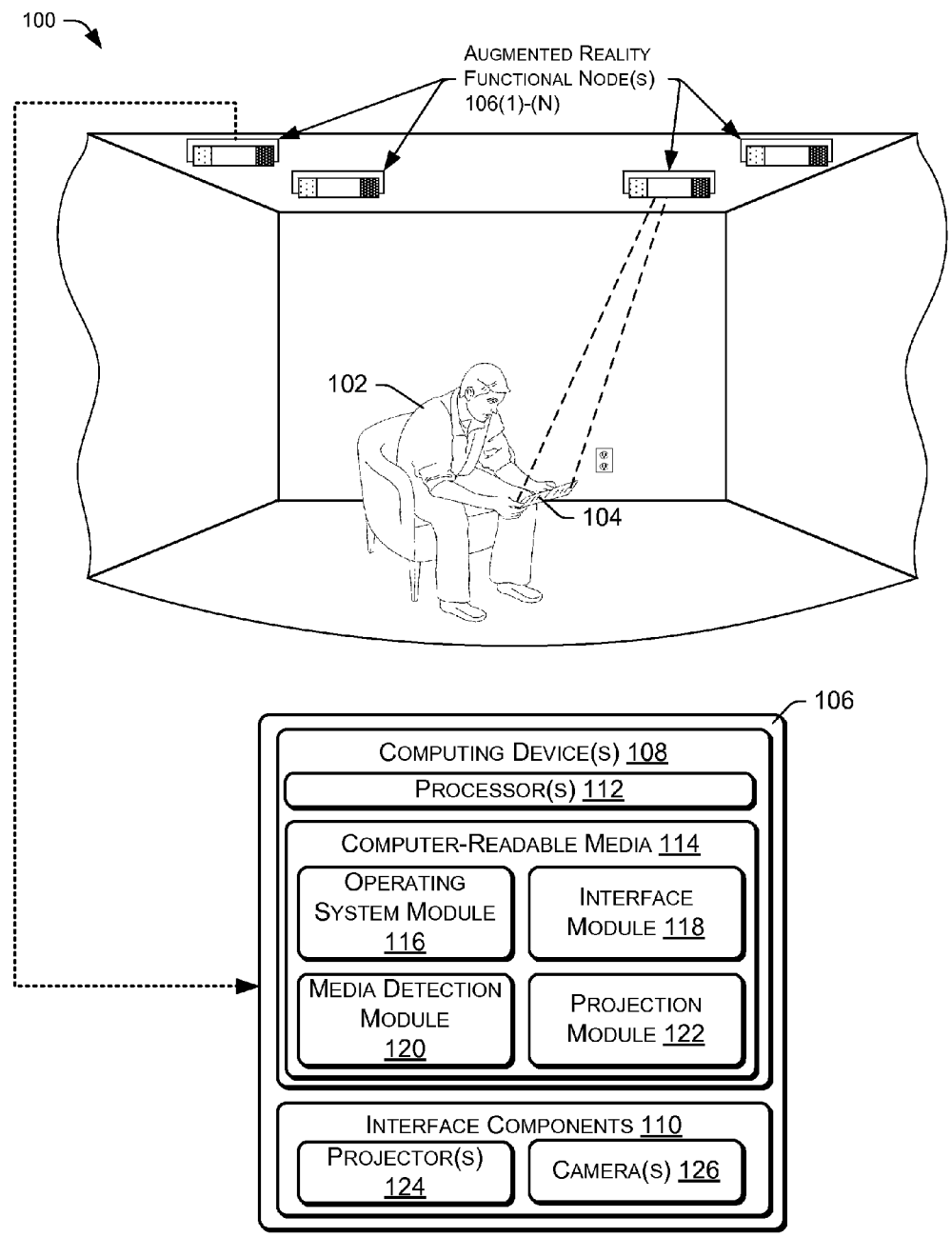
FIG. 1 illustrates an environment that includes an augmented reality functional node (ARFN) that detects the pose of a handheld display medium for projecting content onto the display medium.

This disclosure describes systems and techniques for detecting the position and orientation of an object. In certain embodiments, the object may be a rectangular sheet, such as a blank card or sheet of white paper, onto which content is projected. The display medium for example, may be held by a user, and the user may move the display medium in different ways through a room or other environment. As the user and the display medium move, the position and orientation of the display medium are detected so that an image can be projected correctly onto the display medium.

For example, the described systems and techniques may allow the user to read an electronic book, watch a video, view images, or otherwise consume any other form of projected content on the display medium.

To detect the position and orientation of the display medium, referred to as the "pose" of the display medium, a three-dimensional (3D) image, point set, or depth map of a scene containing the display medium is obtained and segmented to produce 3D point sets or point clouds corresponding to different surfaces within the scene. The different surfaces and their 3D point sets are then evaluated to determine which of the surfaces most likely represents the display medium. This surface is then examined in more detail.

After identifying the 3D point set representing the surface of the display medium, the point set is analyzed to determine the pose of the display medium. The 3D point set of the surface is processed to identify a 3D image contour, also referred to herein as a data contour or observed contour, which comprises those 3D points of the point set that are at the periphery or outer boundary of the display medium. A 3D corner model is then constructed and aligned to the contour using a technique such as iterative closest point (ICP) minimization. This aligning is repeated several times to identify the 3D pose of each of corner of the display medium.

Based on the 3D poses of the identified corners, the size of the display medium may be estimated, and a model contour of the display medium may be created. This model contour is then matched to the observed contour to determine the overall pose of the display medium.

A sequence of poses may be monitored and filtered to generate the current pose of the display medium. Such a pose sequence may also be the basis of predicting a future pose or a future series of poses. For example, an observed pose sequence may be analyzed to estimate the parameters of a motion model that represents past and future motion of the display medium. Predictions may be compared against actual observations to determine whether the predictions are stable. If the predictions are not stable, they may be ignored.

The operations described above result in a motion model for the display medium, describing its current pose and predicted movements relative to the pose. Based on this information, projected content is aimed, scaled, rotated, and so forth in order to occupy the surface of the display medium.

Example Environment

FIG. 1 illustrates an example environment 100 in which a user 102 consumes content that is projected onto a passive or non-powered handheld display medium 104 by one or more augmented reality functional nodes (ARFNs) 106(1), . . . , 106(N) (collectively referred to as "the ARFN 106" in some instances). It is to be appreciated that the techniques described herein may be performed by a single ARFN, by a collection of any number of ARFNs, or by any other devices or combinations of devices.

The projected content may include any sort of multimedia content, such as text, color images or videos or any other visual content. In some cases, the projected content may include interactive content such as menus and controls.

Each ARFN 106 may include one or more computing devices 108, as well as one or more interface components 110. The computing devices 108 and interface components 110 may be configured in conjunction with each other to interact with the user 102 within the environment 100. In particular, the ARFN 106 may be configured to project content onto the display medium 104 for viewing by the user 102.

The computing device 108 of the example ARFN 106 may include one or more processors 112 and computer-readable media 114. The processors 112 may be configured to execute instructions, which may be stored in the computer-readable media 114 or in other computer-readable media accessible to the processors 112. The processor(s) 112 may include digital signal processors (DSPs), which may be used to process audio signals and/or video signals.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 108. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth that are configured to execute on the processors 112. For instance, the computer-readable media 114 may store an operating system module 116 and an interface module 118.

The operating system module 116 may be configured to manage hardware and services within and coupled to the computing device 108 for the benefit of other modules. The interface module 118 may be configured to receive and interpret commands received from users within the environment 100, and to respond to such commands in various ways as determined by the particular environment.

The computer-readable media 114 may also include a media detection module 120 that is executable to perform certain processing as described below. In particular, the detection module 120 may implement the techniques described below for determining the current and predicted poses of the display medium 104 within the environment 100.

The computer-readable media 114 may further include a content projection module that is executable to project content onto the display medium 104. The projection module 122 may receive the pose of the display medium 104, or parameters that can be used with a motion model from the media detection module 120, and may manipulate the projected content so that it appears correctly on the display medium 104 after accounting for the size, pose, and predicted motion of the display medium. For example, the projection module 122 may vary the size, location, orientation and aspect ratio of the projected image. The projection module 122 may also use techniques such as keystone correction to correct the appearance of the projected image in situations where the projection source is not aligned with the display medium. For example, the projected image may be intentionally distorted to account for a non-perpendicular alignment of the display medium with respect to the projection source. In some situations, the projected image may also be distorted to correct for irregularities or non-planar characteristics of the display medium.

The computer-readable media 114 may contain other modules, which may be configured to implement various different functionality of the ARFN 106.

The ARFN 106 may include various interface components 110, such as user interface components and other components that may be used to detect and evaluate conditions and events within the environment 100. As examples, the interface components 110 may include one or more projectors 124 and one or more cameras 126. The interface components 110 may in certain implementations include various other types of sensors and transducers, content generation devices, and so forth, including microphones, speakers, range sensors, and other devices.

The projector(s) 124 may be used to project content onto the display medium 104 for viewing by the user 102. In addition, the projector(s) 124 may project patterns, such as non-visible infrared patterns, that can be detected by the camera(s) 126 and used for 3D reconstruction and modeling of the environment 100. The projector(s) 124 may comprise a microlaser projector, a digital light projector (DLP), cathode ray tube (CRT) projector, liquid crystal display (LCD) projector, light emitting diode (LED) projector or the like.

The camera(s) 126 may be used for various purposes, such as determining the location of the user 102, detecting user gestures, determining the poses of the medium 104 and objects within the environment 100, reconstructing 3D characteristics of objects within the environment 100, and so forth. Various forms of structured light analysis may be used in conjunction with the camera(s) 126 to reconstruct 3D properties of the environment 100. Other techniques and image sensors may also be used for this purpose, such as range finders, depth sensors, and devices that analyze optical or audio time-of-flight observations.

The coupling between the computing device 108 and the interface components 110 may be via wire, fiber optic cable, wireless connection, or the like. Furthermore, while FIG. 1 illustrates the computing device 108 as residing within a housing of the ARFN 106, some or all of the components of the computing device 108 may reside at another location that is operatively connected to the ARFN 106. In still other instances, certain components, logic, and/or the like of the computing device 108 may reside within a projector or camera. Therefore, it is to be appreciated that the illustration of the ARFN 106 of FIG. 1 is for illustrative purposes only, and that components of the ARFN 106 may be configured in any other combination and at any other location.

Furthermore, additional resources external to the ARFN 106 may be accessed, such as resources in another ARFN 106 accessible via a local area network, cloud resources accessible via a wide area network connection, or a combination thereof. In still other instances, the ARFN 106 may couple to and control other devices within the environment, such as televisions, stereo systems, lights, and the like.

In other implementations, the components of the ARFN 106 may be distributed in one or more locations within the environment 100. For example, the camera(s) and projector(s) may be distributed throughout the environment and/or in separate chasses.

In operation, the user 102 simply picks up the passive display medium 104. In response, the ARFN 106 recognizes and detects the location and orientation of the medium 104, and begins projecting content onto the medium 104. The user 102 is then able to observe or consume the projected content as well as navigate to other content, just as the user would be able to do using a traditional portable electronic device.

The ARFN 106 may also track the location and orientation (pose) of the medium 104 and continue to project an image onto the medium 104 at different locations within the environment as the medium moves. Thus, the user 102 is able to move about within the room and continue to consume the projected content. The ARFN 106 may distort or otherwise manipulate the projected image to account for different orientations, sizes and shapes of the medium 104, as well as for varying distances between the ARFN 106 and the medium 104.

The media detection module 120 is configured to repeatedly and continuously detect the 3D pose of the display medium 104, and to calculate parameters of a motion model predicting future motion of the display medium 104. The detection module 120 passes this information to the projection module 122. In response, the projection module directs the projected image onto the medium 104 at the detected location, and adjusts the projected image to account for size and pose of the object relative to the projector 124. The detection module 120 may continue to track the pose of the medium 104 as the user 102 and the medium 104 move, and may continue to pass motion information along to the projection module 122. By doing so, the projection module 122 is able to correctly project the content onto the medium 104 even as the pose of the medium 104 changes.

Although the display medium 104 may have any desired size and shape, in the embodiment described herein the passive medium 104 is a rectangle or other polygon, and may be of any desired size. It is not necessary for the ARFN 106 to have prior knowledge regarding the size of the medium 104.

The passive medium 104, as an example, may comprise a 3 by 5 inch card or an 8.5 by 11 inch sheet of plain white paper. Alternatively, the passive medium 104 may be any object having an approximately planar surface upon which images can be projected. The surface of the medium 104 may also be irregular or non-planar in some embodiments.

Overall Process

Figure 2:
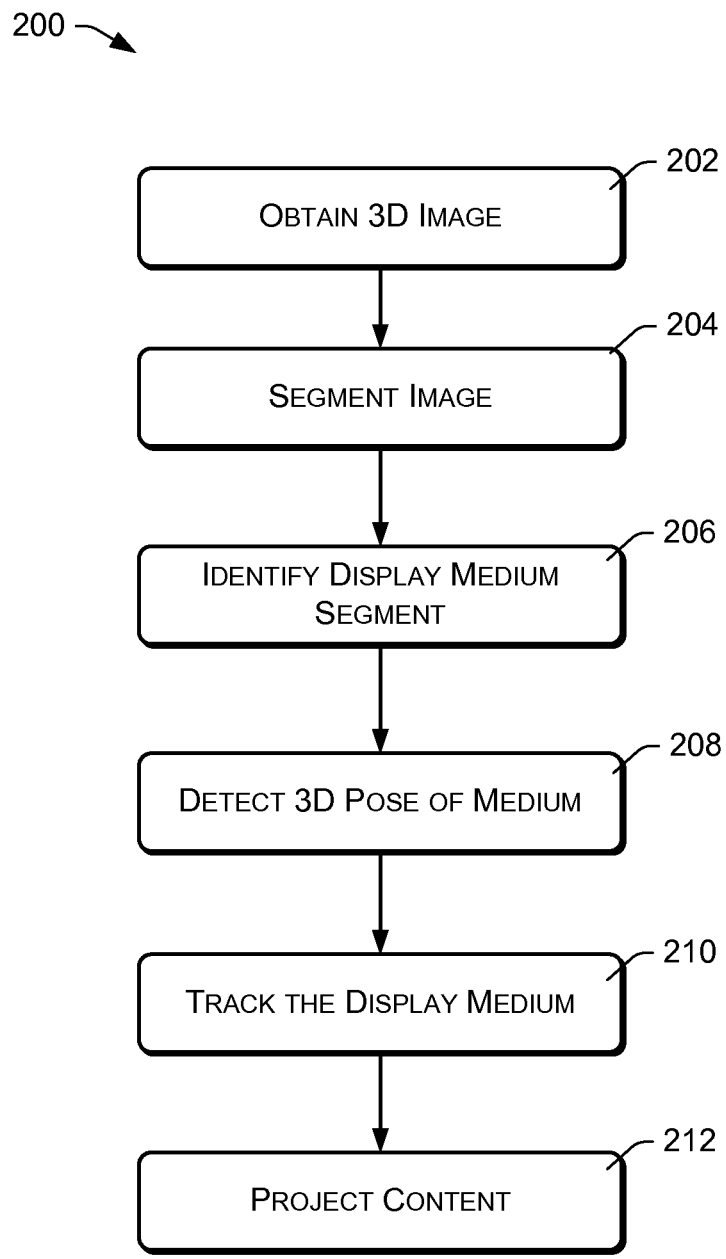
FIG. 2 is an example flow diagram of an ARFN locating a handheld display medium and projecting content onto the display medium.

FIG. 2 illustrates an example method 200 of locating and tracking the pose of a passive, reflective, or translucent medium such as the handheld medium 104 of FIG. 1, and of projecting content onto the medium 104. The method is described with reference to the environment of FIG. 1, although various aspects of the method may be utilized in different environments, using different types of components.

An action 202 comprises obtaining a 3D image of the environment 100. The 3D image may comprise a depth map or 3D point cloud obtained, calculated, or reconstructed by the ARFN 106 in conjunction with the projector 124 and camera 126. For example, the ARFN 106 may utilize structured light analysis do determine the distance of surface points viewed by the camera 126. Specifically, the projector 124 may project a structured light pattern onto the scene within the environment 100, and the camera 126 may capture an image of the reflected light pattern. Deformation in the reflected pattern, due to a lateral displacement between the projector 124 and the camera 126, may be analyzed by the ARFN 106 to determine depths or distances corresponding to different points, areas, or pixels within the environment 100. Other types of systems may alternatively be utilized to obtain a 3D image of the environment, such as techniques involving time-of-flight observations.

An action 204 comprises segmenting the 3D image to generate multiple 3D point sets corresponding to different surfaces within the 3D image. Segmenting may be performed using surface normals that represent the orientation of local surfaces in a 3D point set (K. Klasing, D. Althoff, D. Wollherr, and M. Buss: Comparison of Surface Normal Estimation Methods for Range Sensing Applications, Proc of IEEE ICRA 09). Initial segmentation may be performed in the surface normal domain. Surfaces containing smoothly varying surface normals may be clustered by various techniques. For example, an algorithm known as the watershed transformation may be used for initial segmentation (Olsen, O. and Nielsen, M.: Multi-Scale Gradient Magnitude Watershed Segmentation, Proc. of ICIAP 97). Further processing, including merging and splitting identified segments, may be performed in different embodiments. For planar surface segmentation, a segment resulting from surface normal clustering may be processed by a plane estimation routine such as random sample consensus (RANSAC) plane estimation. Surfaces with similar plane equations may be merged into one segment, or split vice versa.

An action 206 may comprise analyzing and/or comparing the identified segments and their respectively corresponding 3D point sets to identify one or more of the segments that are likely to represent or contain the display medium 104. This may be performed in accordance with various object recognition techniques. In some embodiments, methods of relatively low complexity may be used to initially evaluate the likelihood that a particular segment contains the display medium. For example, assuming that the display medium 104 is white, the action 206 may identify segments that are predominately white. Other properties or characteristics of the display medium may similarly be used. For example, the action 206 may perform a rough search based on the general shape, size, or aspect ratio of the display medium, without attempting to conclusively determine whether any given segment contains the display medium. Furthermore, this analysis may be performed on relatively sparse data, in order to further reduce the complexity of processing.

An action 208 may comprise detecting the 3D pose of the display medium, by examining the 3D point set of a segment identified in the action 206. This action will be described in more detail below, with reference to FIGS. 3 and 4.

An action 210 may comprise tracking the pose of the medium 104, and predicting or anticipating movement of the display medium over time. In some embodiments, the action 210 may comprise generating parameters of a motion model that can be used to predict future motion of the display medium 104. The action 210 will be described in more detail below, with reference to FIG. 4.

An action 212 may comprise projecting content onto the display medium 104, while accounting for its current and/or anticipated 3D pose. For example, the projector 124 may be directed to pan, zoom, or rotate its projected image to follow the display medium 104.

Pose Detection

Figure 3:
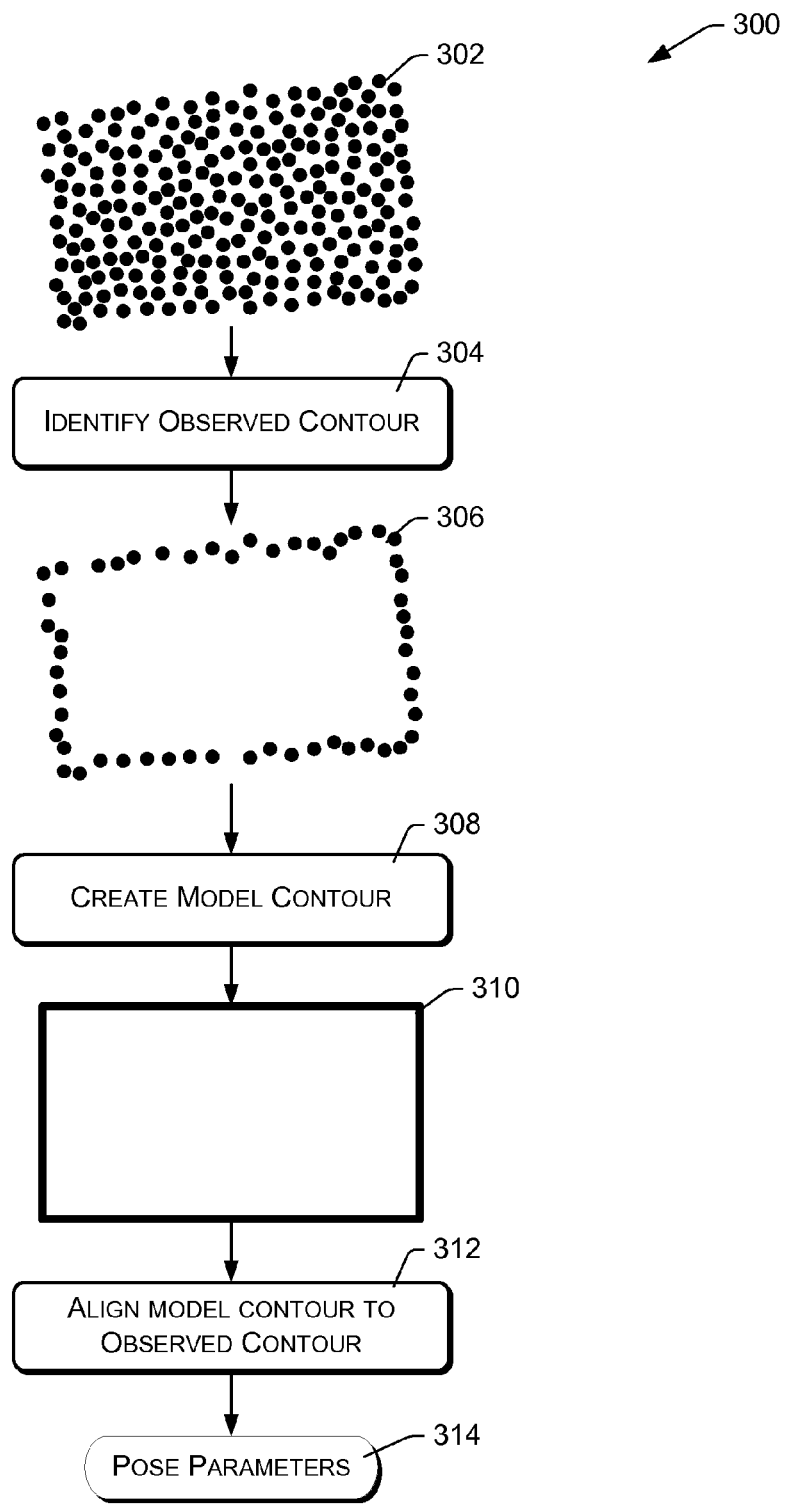
FIG. 3 is an example flow diagram of an ARFN determining the 3D pose of the display medium.

FIG. 3 shows an example method 300 of determining the pose of the display medium 104, based on a 3D point set 302 representing the medium 104. The 3D point set 302 may be obtained as described above, using structured light analysis or some other technique in conjunction with the projector 124 and the camera 126. The pose of the display medium may be specified in terms of position and orientation in three dimensions. Position may be specified by linear measurements with respect to orthogonal 3D axes such as X, Y, and Z. Orientation may be specified by angular measurements around the 3D axes, such as by the angles $\theta_x$, $\theta_y$, and $\theta_z$, corresponding to angular measurements with respect to the X, Y, and Z axes, respectively. Thus, a pose may be indicated or specified by the vector $[X, Y, Z, \theta_x, \theta_y, \theta_z]$.

An action 304 comprises identifying a contour or boundary 306 of the 3D point set 302, which will be referred to herein as the data contour or observed contour. The observed contour 306 includes the 3D points lying on the outermost edges or periphery of the 3D point set 302. To calculate or construct the observed contour 306, an intensity threshold may be applied to the points of the 3D point set 302 to create a binary image, which may in turn be smoothed or otherwise filtered. Boundary or edge points may be identified using various available techniques (H. Edelsbrunner, D Kirkpatrick, and R. Seidel: On the Shape of a Set of Points in the Plane, IEEE Transactions on Information Theory, July, 1983).

An action 308 may comprise creating a model contour 310 corresponding to display medium 104. This action assumes that the size of the display medium is known. If the size of the display medium is not known, the method of FIG. 4, described below, may be performed to determine or estimate the size of the display medium. The model contour may comprise points corresponding to the edges or periphery of the display medium 104, based on its expected or estimated size.

An action 312 may comprise matching or aligning the model contour 310 to the observed contour 306. This can be performed using ICP parameter identification or other techniques. A starting pose of the model contour 310, to use as the basis for matching, may be estimated based on known poses of the corners of the display medium 104, as determined as part of the method illustrated by FIG. 4. The result of the aligning 312 is a set of pose parameters 314 defining the pose of the display medium 104. Alternatively, the aligning 312 may output the 3D positions of the corners of the display medium 104.

The technique shown in FIG. 3 can be used to dynamically detect the pose of a passive display medium in an environment. The technique is particularly useful in situations where the shape or contour of the display medium is known, but the size and/or aspect ratio of the display medium are unknown.

In some embodiments, medium presence verification may additionally be performed based upon the results of the described matching. For example, the ARFN 106 may use the results of the matching to verify that the dimensions of the display medium 104 are within certain ranges. For example, the ARFN may determine the height-to-width ratio of a detected display surface, and may determine that the detected surface does not qualify as a valid display medium based on a height-to-width ratio that is outside of a predefined tolerance.

Figure 4:
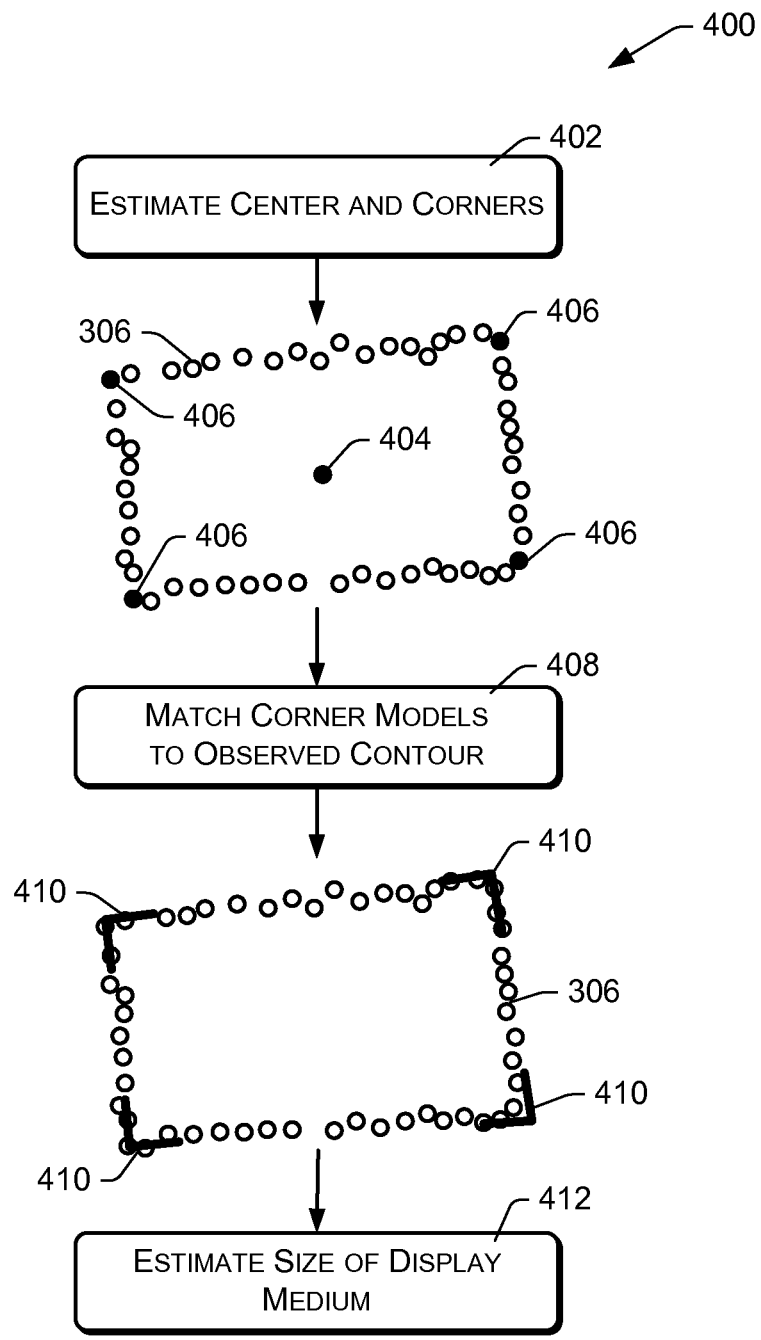
FIG. 4 is an example flow diagram of an ARFN determining or estimating the size of the display medium.

FIG. 4 illustrates an example method 400 that may be performed in situations where the size of the display medium 104 is not known ahead of time, in order to calculate or estimate the size of the display medium based on observations.

An action 402 comprises locating or estimating the center 404 and corners 406 of the observed contour 306. The center 404 can be estimated by averaging the coordinates of the points of the observed contour 306. The corners 406 can be estimated by calculating the distances from the center 404 to each of the observed contour points, identifying local maxima in the distances, and selecting corresponding points of the observed contour 306.

An action 408 comprises comparing 3D corner models 410 to the observed contour 306, to determine the pose of each corner of the observed contour 306. The comparing may include matching or aligning the 3D corner models 410 to the observed contour 306. The 3D corner models 410 are constructed as 3D point sets corresponding to 90 degree or right-angle corners. As a starting point or initial condition, the corner models 410 are assumed to be located at the corners 406 identified by the action 402. Based on this initial condition, a distance minimization search or algorithm is performed to determine the pose of each corner model 410 that corresponds most closely with the actual points of the observed contour 306. Such a search can be performed using a method or algorithm known as iterative closest point (ICP) parameter identification. ICP parameter identification minimizes the difference between two point sets. In this case, ICP is used to minimize the difference between the points of the corner model 410 and the points of the observed contour 306. The result of the ICP minimization are sets of pose parameters specifying 3D poses for each of the corner models 410.

An action 412 may then comprise calculating or estimating the size of the display medium 104, based on the poses of its corners, determined as described above.

Note that the matching or aligning of the action 408 may utilize various types of features, including corners, edges, angles, and so forth.

Generating Motion Parameters

Figure 5:
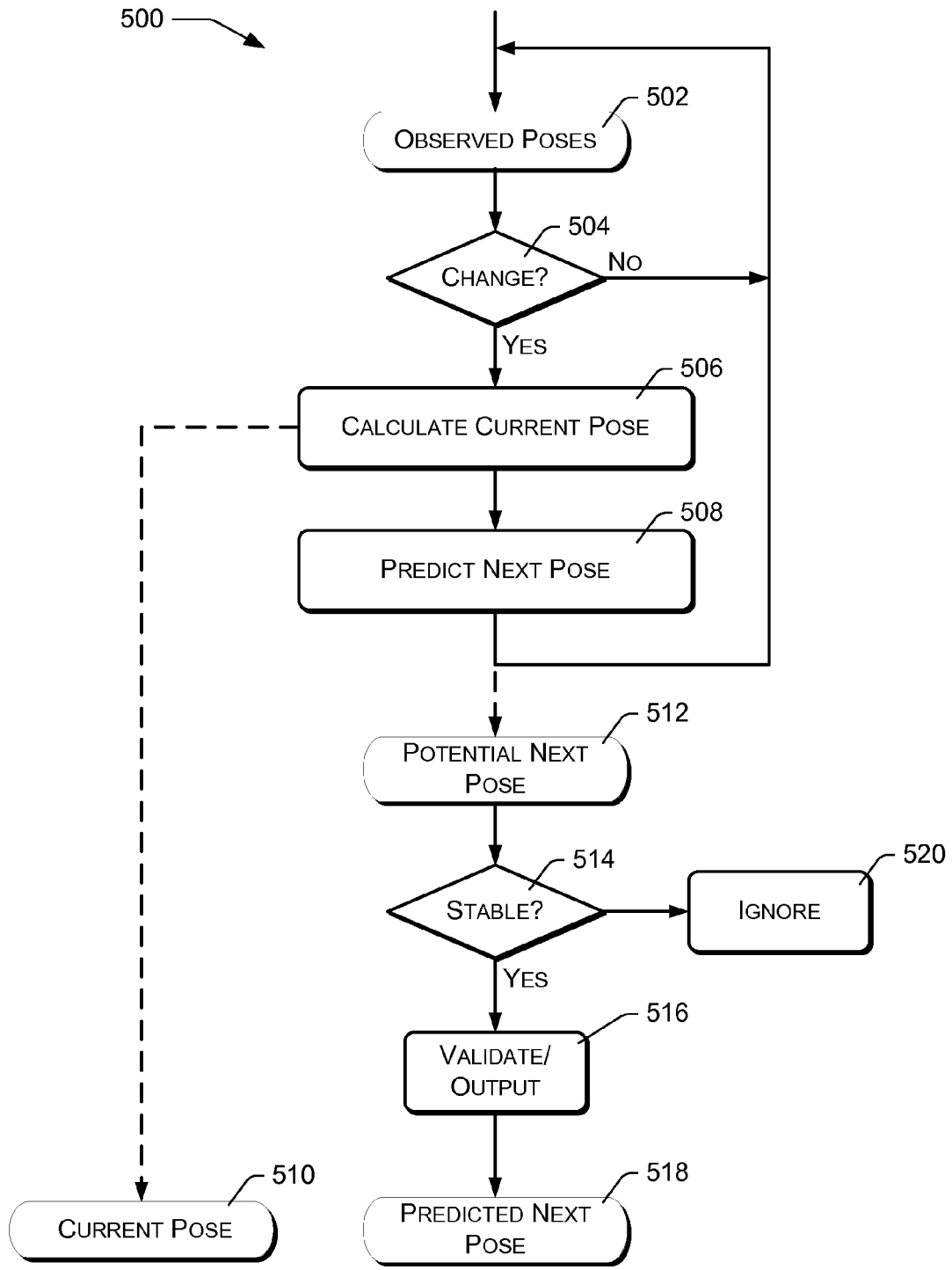
FIG. 5 is an example flow diagram of an ARFN tracking and predicting the pose of the display medium.

FIG. 5 illustrates an example method 500 of determining the present and future motion profile of the display medium 104. The example method 500 receives as input a series or sequence of observed display medium locations or poses 502 such as might result from the method of FIG. 3. In this example, it is assumed that the display medium positions are received as sequential sets of 3D pose vectors, each specifying a 3D location of the display medium 104 and an angular orientation of the display medium 104. In some embodiments, the 3D poses 502 may be represented or specified as 3D coordinates of the corners of the display medium 104.

An action 504 may comprise monitoring the observed poses 502 and detecting when there is a change in the pose of the display medium 104. If a change is detected, indicating movement of the display medium 104, the new pose of the display medium 104 and a predicted future pose of the display medium 104 are calculated in accordance with actions 506 and 508. Otherwise, if there are no changes in the pose 502, the action 504 repeats itself as more 3D poses 502 are received.

The action 506 comprises calculating a current location or pose 510 based on a historical sequence of observed poses of the display medium 104, including the most recent location of the display medium 104. The action 508 comprises calculating a potential next pose 512, again based on the historical sequence of observed poses 502.

The actions 506 and 508 may be performed using continuous-time system dynamics. More specifically, motion or movement of the display medium 104 can be described as a continuous-time movement. Such continuous movement can be characterized by continuous-time system dynamics, and can be described by a dynamic motion model or function, comprising a set of state equations.

A dynamic motion model can be associated with a matrix or set of parameters, referred to herein as motion parameters, in order to model or describe a particular path of the display medium 104. In the described embodiment, such a matrix can be estimated by minimizing differences between the output of the motion model and the historical sequence of observed poses 502. Specifically, such motion parameters may be estimated using recursive least squares (RLS) parameter identification. Once determined, the motion parameters may be applied to the dynamic motion model to determine past and present poses of the display medium 104.

As an example of applying an RLS adaptive filter to a motion model, let $$\hat{\theta}_t = \hat{\theta}_{t-1} + K_t[y_t - \varnothing_t \hat{\theta}_{t-1}] \text{ and}$$

$$P_t = P_{t-1} + K_t \varnothing'_{t-1} P_{t-2}$$

where:
$K_t = P_{t-1} \varnothing_t [I + \varnothing'_t P_{t-1} \varnothing_t]^{-1};$ θ is a vector that includes rotation and translation parameters; and
$\hat{\theta}$ is an estimate of θ;
Ø is a matrix of state variables;
$y_t = Ø'_t θ$ is the linear regression model of the motion state equation $x_{t+1} = Rx_t + T$, where T is the translation vector and R is the rotation matrix; and
the initial condition $P_0$ is assumed to be positive;
$x_t$ is a state variable or pose vector, comprising the position and orientation of the display medium at time t.

In an iterative process, for each historical observation, the covariance matrix $P_t$ and $Ø_t$ are calculated. An error between the estimate model and the regression model, $e_t = y_t - Ø'_t \hat{\theta}$ is calculated each iteration. This process is iterated for n historical observations, where n may range from 7 to 20 based on the motion behavior. When the error is convergent to a stable small value, the estimate is then selected. Appropriate motion modeling and parameter estimation techniques using RLS are discussed in "Rigid Object Motion Parameter Estimation from a Dynamic Image Sequence", Ph.D. dissertation by S. Chang, George Mason University, Fairfax, Va., 1997. Other known methods of motion modeling and motion parameter estimation may also be used.

An action 514 comprises determining whether the calculated potential next pose 512 represents a stable prediction. This may be evaluated by comparing a history of past predictions 512 with a corresponding history of calculated current poses 510. Specifically, the action 514 may comprise determining whether the predicted locations or poses of the display medium 104 correlate with subsequently observed locations or poses of the display medium 104. If there is a recent history of accurate predictions, as indicated when recent predictions correlate with corresponding observations, the potential next pose prediction is considered stable and is therefore validated and output in an action 516 as a predicted next pose 518. Otherwise, if the potential next pose 512 does not represent a stable prediction, the predicted next pose 512 is ignored or discarded in an action 520.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
  one or more processors;
  an imaging sensor;
  a projector;
  one or more computer-readable media storing computer-executable instructions that, when executed by the one or more processors, cause the one or more processors to perform acts comprising:
    obtaining a first candidate point set and a second candidate point set using the imaging sensor;
    determining a first likelihood that the first candidate point set represents a display medium upon which content is to be projected;
    determining a second likelihood that the second candidate point set represents the display medium;
    determining that the first candidate point set is a point set that represents the display medium based at least partly on at least one of the first likelihood or the second likelihood;
    identifying, from the point set, an observed contour corresponding to a periphery of the display medium;
    comparing one or more corner models to the observed contour to identify one or more corner poses corresponding to at least one corner of the display medium;
    estimating a size of the display medium based at least in part on the one or more corner poses corresponding to the at least one corner of the display medium;
    identifying a pose of the display medium at a first time based at least in part on the size of the display medium;
    determining a prior pose of the display medium at a second time that is prior to the first time;
    determining a difference between the pose of the display medium and the prior pose of the display medium;
    predicting a future pose of the display medium based at least in part on the difference; and
    projecting the content onto the display medium from the projector at the pose of the display medium or the future pose of the display medium.

2. The system of claim 1, wherein identifying the pose of the display medium comprises:
  creating a model contour of the display medium based at least in part on the size of the display medium; and
  aligning the model contour of the display medium to the observed contour.

3. The system of claim 2, wherein aligning the model contour comprises determining a position of the model contour that minimizes differences between points of the model contour and points of the observed contour.

4. The system of claim 1, wherein comparing the one or more corner models comprises determining positions of the corner models that minimize differences between points of the corner models and the points of the observed contour.

5. The system of claim 1, wherein comparing the one or more corner models uses iterative closest point minimization to determine positions of the corner models that minimize differences between points of the corner models and the points of the observed contour.

6. The system of claim 1, the acts further comprising estimating corners of the observed contour prior to comparing the one or more corner models.

7. The system of claim 1, the acts further comprising:
  estimating a center of the observed contour; and
  identifying corners of the observed contour prior to comparing the one or more corner models, based at least in part on distances of observed contour points from the center of the observed contour.

8. A method comprising:
  determining a size of an object;
  obtaining a point set;
  determining a likelihood that the point set represents at least a portion of the object;
  determining that the point set represents the at least the portion of the object based at least partly on the likelihood;
  identifying, from the point set, a first contour representing a periphery of the object;
  creating a second contour of the object based at least partly on the size of the object;
  determining a position of the object at a first time by aligning the second contour with the first contour;
  determining a prior position of the object at a second time that is prior to the first time;

determining a difference between the position of the object and the prior position of the object; and determining a future position of the object based at least in part on the difference.

9. The method of claim 8, further comprising:

determining corners of the first contour;

wherein the determining the position of the object is based at least in part on the corners of the first contour.

10. The method of claim 8, wherein the aligning includes minimizing differences between points of the second contour and the point set of the first contour.

11. The method of claim 10, further comprising determining the position of the object based at least partly on one or more edge models, wherein the one or more edge models comprise corner models.

12. The method of claim 10, determining positions of one or more edge models that minimize differences between the one or more edge models and the point set of the first contour.

13. The method of claim 12, wherein the one or more edge models comprise corner models, the method further comprising estimating corners of the first contour prior to comparing the one or more edge models.

14. The method of claim 12, wherein the one or more edge models comprise corner models, the method further comprising:

estimating a center of the first contour; and identifying corners of the first contour prior to comparing the one or more edge models, based at least in part on distances of contour points from the center of the first contour.

15. The method of claim 13, wherein comparing the one or more edge models uses iterative closest point minimization to determine positions of the one or more edge models that minimize differences between the one or more edge models and the point set of the first contour.

16. One or more non-transitory computer-readable media storing computer-executable instructions that, when executed by one or more processors, cause the one or more processors to perform acts comprising:

obtaining a point set;

determining a likelihood that the point set represents at least a portion of a display medium, the display medium having a size;

determining that the point set represents the at least the portion of the display medium based at least partly on the likelihood;

identifying, from the point set, a first contour representing a periphery of the display medium;

creating a second contour corresponding to the size of the display medium;

determining a pose of the display medium at a first time by aligning the second contour with the first contour;

determining a prior pose of the display medium at a second time that is prior to the first time;

determining a difference between the pose of the display medium and the prior pose of the display medium; and determining a future pose of the display medium based at least in part on the difference.

17. The one or more non-transitory computer-readable media of claim 16, further comprising aligning one or more feature models to the first contour to determine the size of the display medium.

18. The one or more non-transitory computer-readable media of claim 17, wherein aligning the one or more feature models comprises determining positions of the one or more feature models that minimize differences between points of the one or more feature models and the point set of the first contour.

19. The one or more non-transitory computer-readable media of claim 17, wherein aligning the one or more feature models uses iterative closest matching to determine positions of the one or more feature models that minimize differences between points of the one or more feature models and the point set of the first contour.

20. The one or more non-transitory computer-readable media of claim 17, wherein the one or more feature models comprise right-angle corner models.

21. The system of claim 1, wherein the determining that the point represents the display medium is based at least in part on characteristics of the object, the characteristics including at least one of a size of the object, a shape of the object, a color of the object, or an aspect ratio of the object.

22. The system of claim 1, wherein predicting the future pose of the display medium comprises calculating one or more parameters of a motion model that represents at least one of past motion of the display medium or future motion of the display medium.

23. The method of claim 8, wherein predicting the future position of the object comprises calculating one or more parameters of a motion model that represents at least one of past motion of the object or future motion of the object.

* * * * *